(12) United States Patent
Runkin et al.

(10) Patent No.: US 8,028,645 B2
(45) Date of Patent: Oct. 4, 2011

(54) DISPENSER APPARATUS WITH A FORWARD MOVING ROTATABLE PLATFORM

(75) Inventors: Gerhard Runkin, Santa Monica, CA (US); Peter Sarttaw, Pasadena, CA (US); Anthony Rogers, Holland, PA (US)

(73) Assignee: JAKKS Pacific, Inc., Malibu, CA (US)

( * ) Notice: Subject to any disclaimer, the term of this patent is extended or adjusted under 35 U.S.C. 154(b) by 729 days.

(21) Appl. No.: 12/154,146

(22) Filed: May 19, 2008

(65) Prior Publication Data
US 2009/0283030 A1    Nov. 19, 2009

(51) Int. Cl.
*A23G 3/28* (2006.01)
(52) U.S. Cl. ............. 118/14; 118/23; 118/24; 141/268; 141/270; 141/366
(58) Field of Classification Search ............. 118/13, 118/14, 23, 24, 52, 320, 500; 141/357, 362, 141/266–270, 364–366, 369, 371; 222/325–327, 222/386, 391; 427/240, 256, 355, 356, 358
See application file for complete search history.

(56) References Cited

U.S. PATENT DOCUMENTS

| 3,724,417 | A  | * | 4/1973  | MacManus ..................... 118/24 |
| 4,074,656 | A  | * | 2/1978  | Haapala ........................ 118/502 |
| 6,390,662 | B1 |   | 5/2002  | Henry et al. |
| 6,903,841 | B2 | * | 6/2005  | Spurgeon et al. ............ 358/1.18 |
| 7,045,738 | B1 | * | 5/2006  | Kovacevic et al. ....... 219/121.63 |
| 7,349,071 | B2 | * | 3/2008  | Van Buel et al. ............... 355/55 |
| 7,443,487 | B2 | * | 10/2008 | Hori ............................... 355/86 |

* cited by examiner

*Primary Examiner* — Laura Edwards
(74) *Attorney, Agent, or Firm* — Tope-McKay & Associates (57) ABSTRACT

A frosting dispenser apparatus including a rotatable platform is described. The frosting dispenser apparatus comprises a body having a base and a pedestal, a rotatable platform is connected with the base and configured to rotate a baked good. Further, a dispenser is connected with the pedestal. The dispenser is located above the rotatable platform. The frosting dispenser apparatus is formed to be easy to use for a child. Additionally, the present invention includes a frosting dispenser apparatus kit which includes a frosting dispenser apparatus, a frosting, a baking mix, a mixing container, a mixing utensil, and a baking container.

3 Claims, 14 Drawing Sheets

DISPENSER APPARATUS WITH A FORWARD MOVING ROTATABLE PLATFORM

BACKGROUND OF THE INVENTION (1) Field of Invention

The present invention relates to a frosting dispenser apparatus and, more particularly, to a frosting dispenser apparatus with a rotatable platform.

(2) Description of Related Art

Dispensers for baked good coating materials, such as frosting, have long been known in the art. Most dispensers for frosting baked goods are handheld and require the user to have a certain amount of strength and coordination in order to dispense the contents of the dispenser properly onto the baked good. This introduces a dilemma if a child would like to help with the decorating process without an adult's assistance.

Thus, a continuing need exists for a frosting dispenser that would be easy for a child to use to frost a baked good, which does not require a high degree of skill.

SUMMARY OF THE INVENTION

The present invention relates to a frosting dispenser apparatus. The frosting dispenser apparatus comprises a body having a base and a pedestal, a rotatable platform connected with the base configured to rotate a baked good, and a dispenser connected with the pedestal, wherein the dispenser is located above the rotatable platform.

In another aspect, the frosting dispenser apparatus further comprises a dispenser actuator operatively connected with the dispenser, such that the dispenser actuator causes the dispenser to dispense its contents.

In another aspect, the present invention further comprises a sliding stage, wherein the rotatable platform is mounted to the sliding stage and the sliding stage is in connection with the base.

In another aspect, the present invention further comprises a driving member connected with the dispenser actuator such that depressing the dispenser actuator pushes the driving member into contact with the sliding stage and drives both the sliding stage and the rotatable platform forward, such that the rotatable platform is below the dispenser.

In yet another aspect, the dispenser is a plunger dispenser.

In another aspect, the present invention further comprises a gear mechanism configured to drive rotation of the rotatable platform.

As can be appreciated by one in the art, the present invention also comprises a method for forming a frosting dispenser apparatus described herein.

Finally, in another aspect the present invention relates to a frosting dispenser kit comprising a frosting dispenser as described herein; at least one container for baking; at least one baking mix; at least one frosting; at least one mixing container; and at least one mixing utensil.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a frosting dispenser apparatus and, more particularly, to a frosting dispenser apparatus with a rotatable platform. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C.

Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Description

Figure 1:
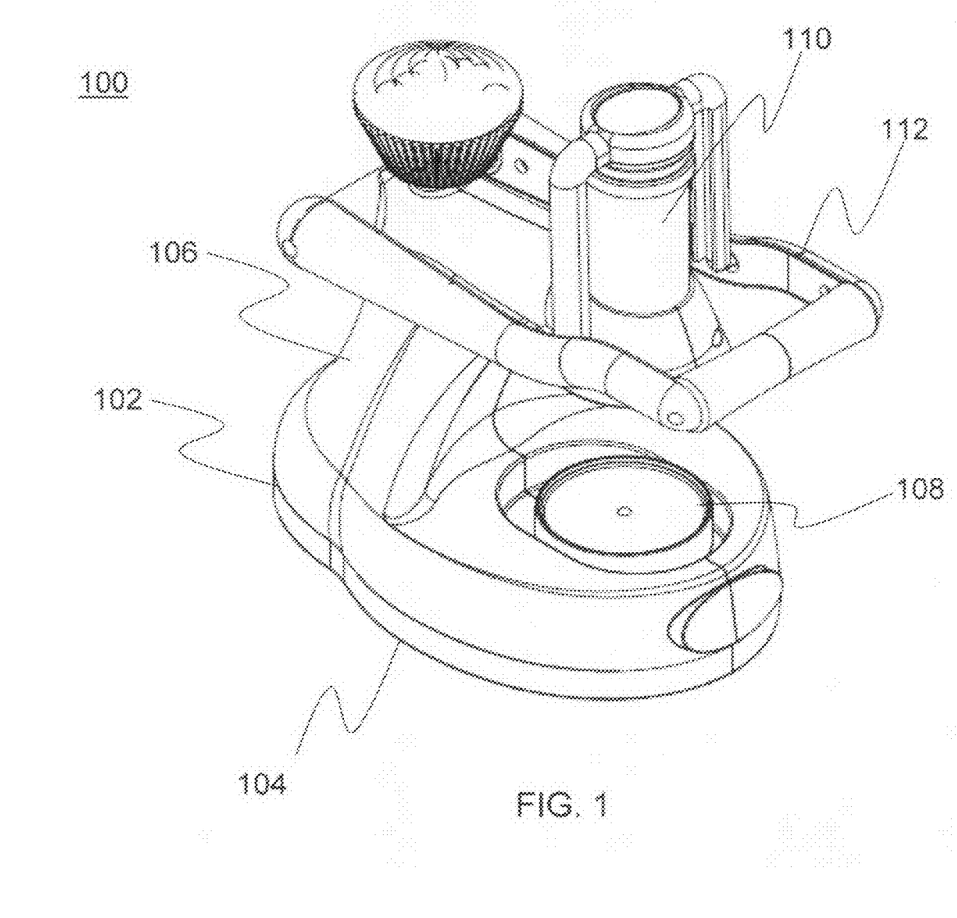
FIG. 1 is a front, perspective-view illustration of a frosting dispenser apparatus according to the present invention.

The present invention relates to a frosting dispenser apparatus. FIG. 1 depicts a front, perspective-view illustration of a frosting dispenser apparatus 100 according to the present invention. The frosting dispenser apparatus 100 includes a body 102 comprising a base 104 and a pedestal 106. The body 102 is constructed of any suitably durable material, a non-limiting example of which includes plastic. A rotatable platform 108 is connected with the base 104 and is configured to rotate a baked good, a non-limiting example of which includes a cupcake. In addition, a dispenser 110 is connected with the pedestal 106 in such a way that the dispenser 110 is located above the rotatable platform 108 so that the dispenser 110 dispenses its contents onto the baked good below as it is rotated. The rotatable platform 108 is formed in any suitable shape to allow placement of a baked good, a non-limiting example of which includes a circular rotatable platform 108.

Additionally, the frosting dispenser apparatus 100 includes a dispenser actuator. The dispenser actuator is any suitable mechanism or device that is formed and operable to cause the dispenser to dispense its contents, a non-limiting example of which includes a handle 112 connected to a plunger and an automated plunger mechanism. As can be appreciated by one skilled in the art, the handle 112 may be any type of handle which is able to operate the dispenser 110. In a desired aspect, the handle 112 is a levered handle 112 with two ends, such that one end is connected with the dispenser 110 and the other is connected with the pedestal 106 as shown in FIG. 1.

Figure 2:
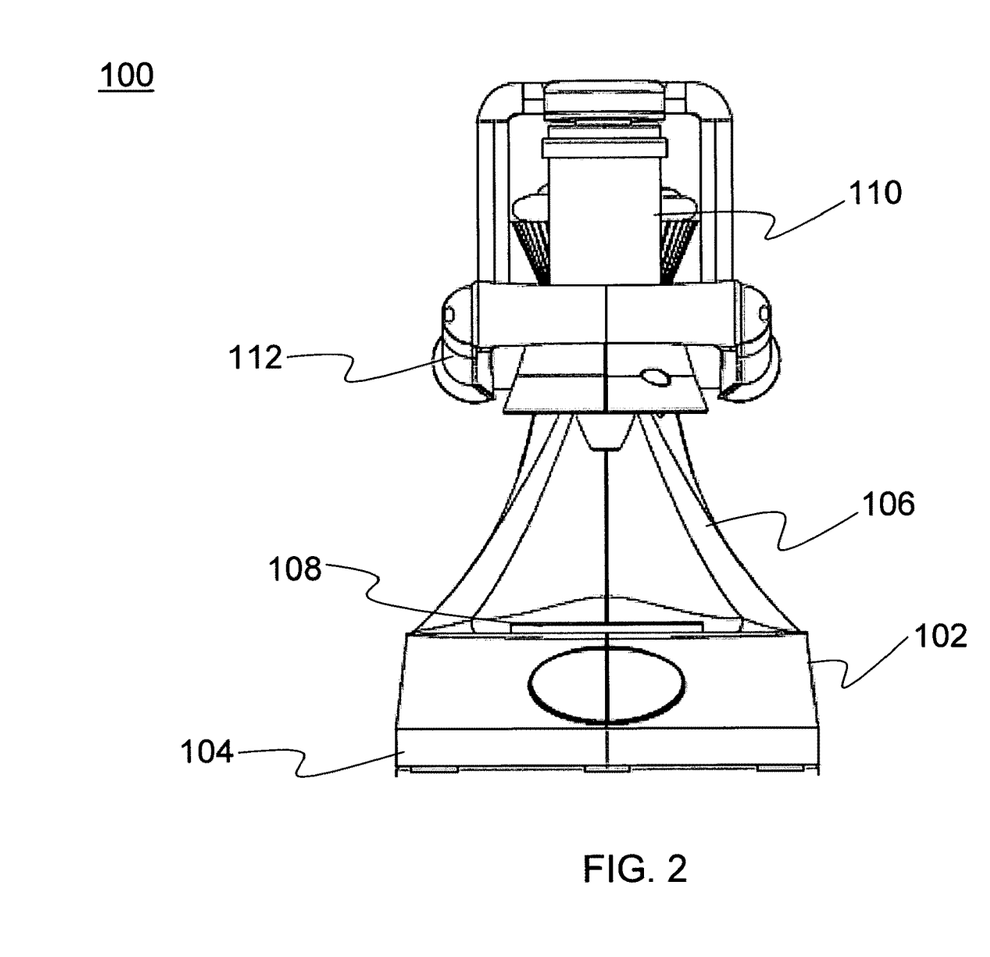
FIG. 2 is a front, orthogonal-view illustration of a frosting dispenser apparatus according to the present invention.
Figure 3:
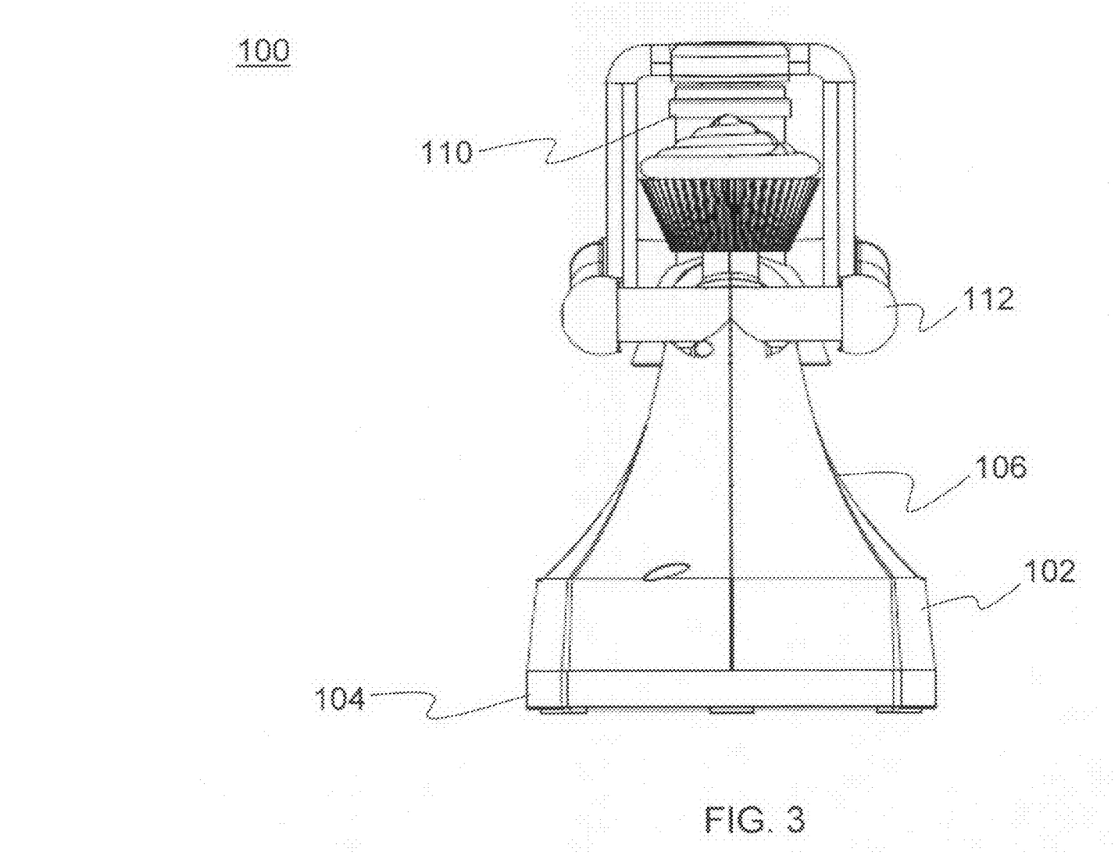
FIG. 3 is a rear-view illustration of a frosting dispenser apparatus according to the present invention.
Figure 4:
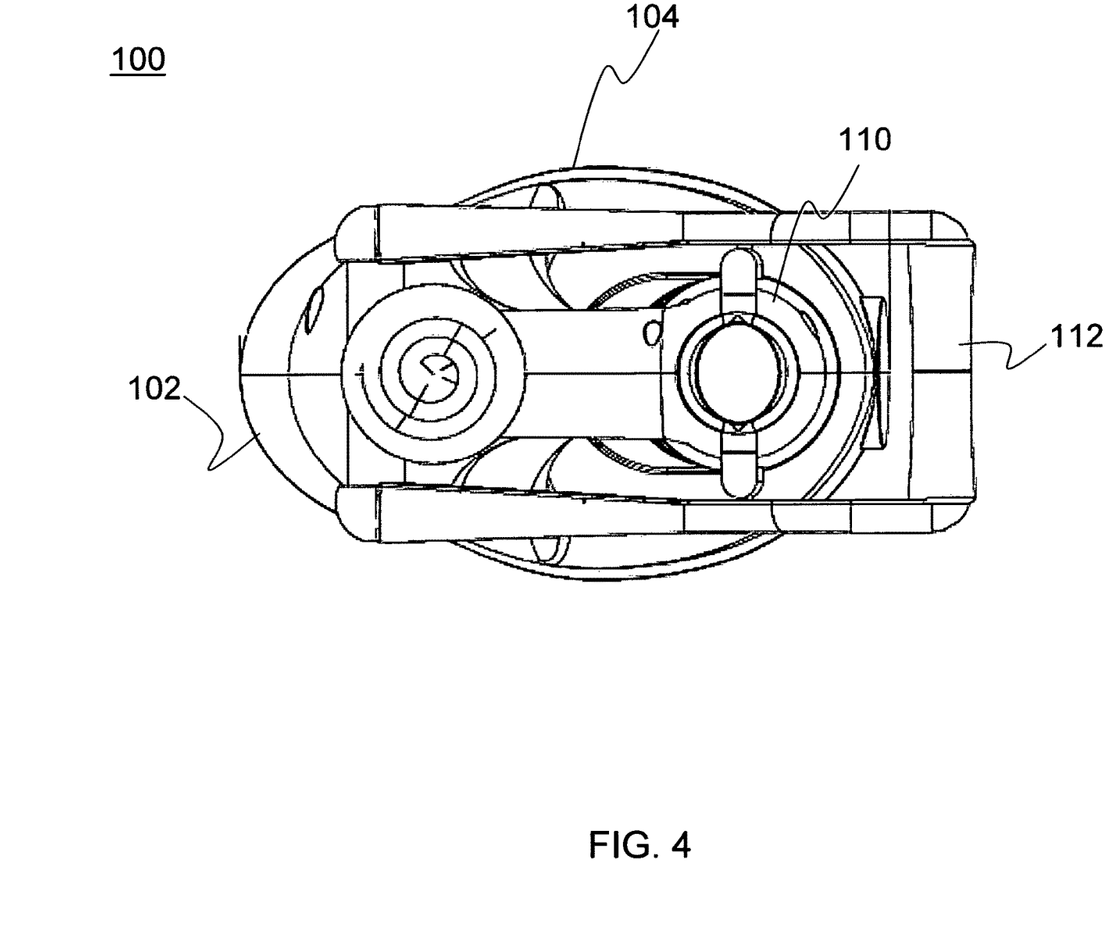
FIG. 4 is a top-view illustration of a frosting dispenser apparatus according to the present invention.
Figure 5:
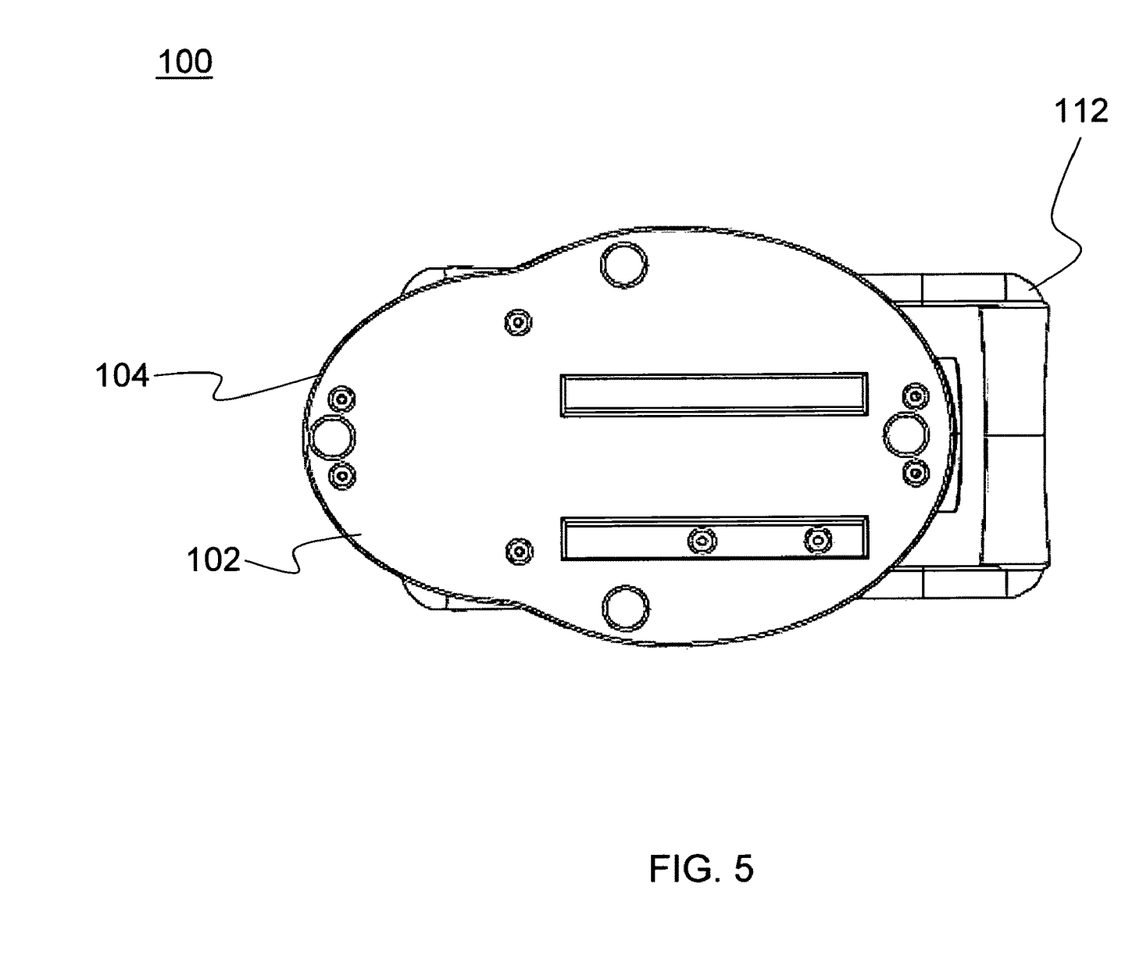
FIG. 5 is a bottom-view illustration of a frosting dispenser apparatus according to the present invention.
Figure 6:
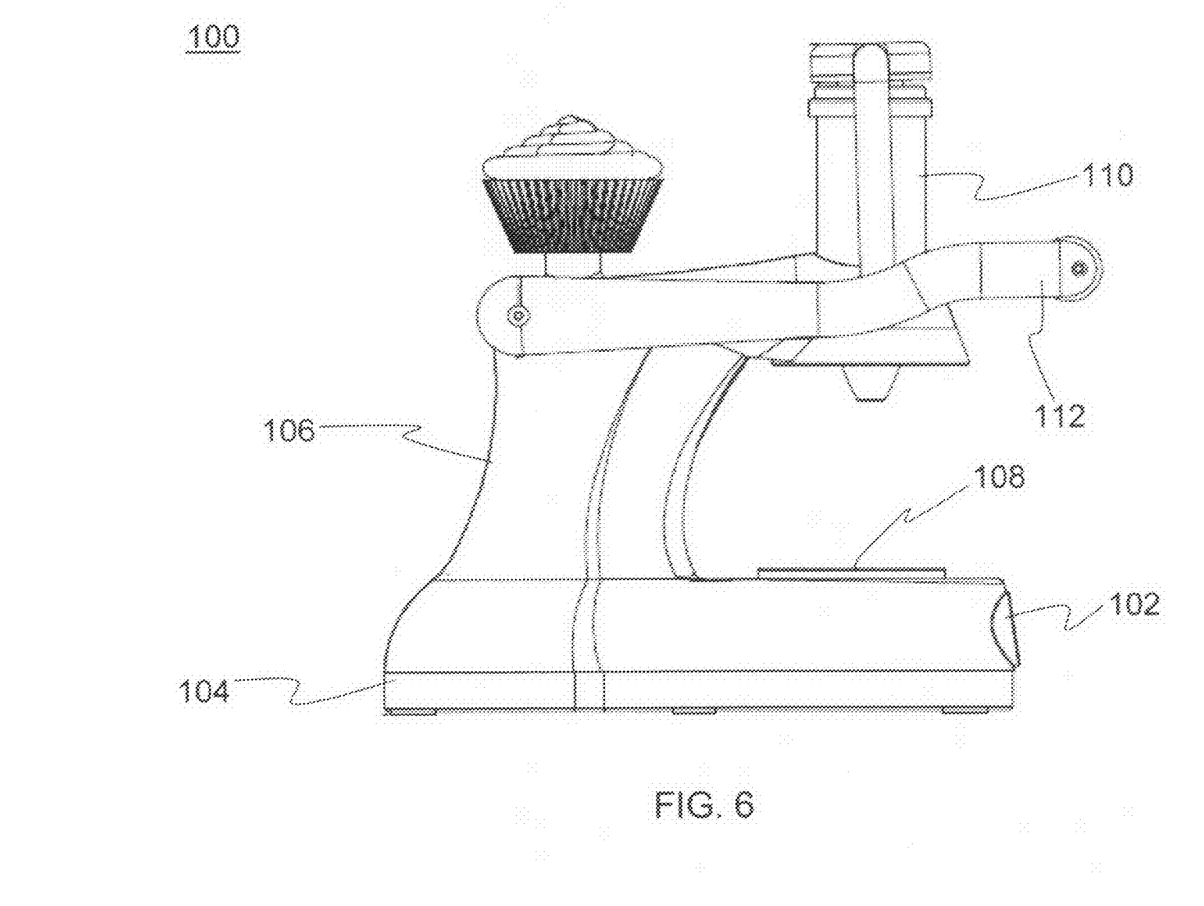
FIG. 6 is a right, side-view illustration of a frosting dispenser apparatus according to the present invention.
Figure 7:
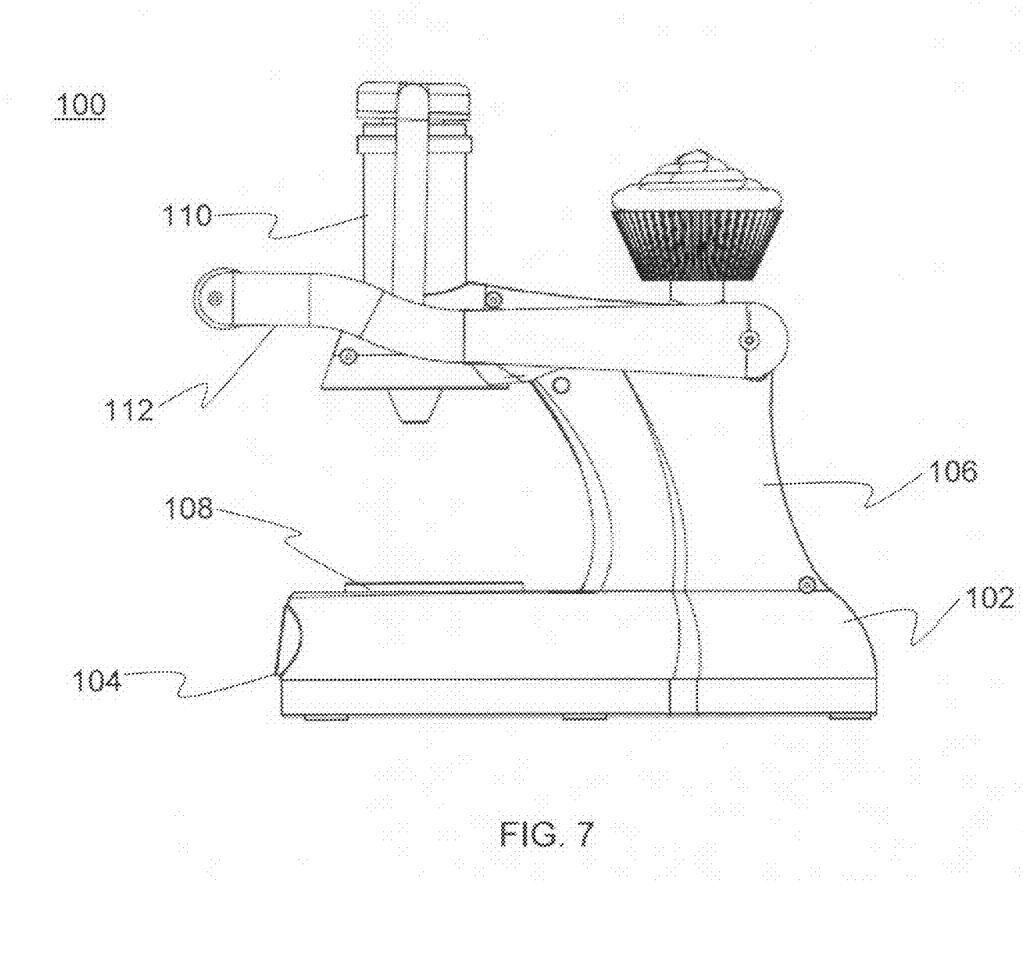
FIG. 7 is a left, side-view illustration of a frosting dispenser apparatus according to the present invention.

FIGS. 2-7 illustrate various views of a frosting dispenser apparatus 100 according to the present invention, including the elements as described above for FIG. 1. More specifically, FIG. 2 is a front orthogonal view; FIG. 3 is a rear-view; FIG. 4 is a top-view; FIG. 5 is a bottom-view; FIG. 6 is a right, side-view; and FIG. 7 is a left, side view.

Figure 8:
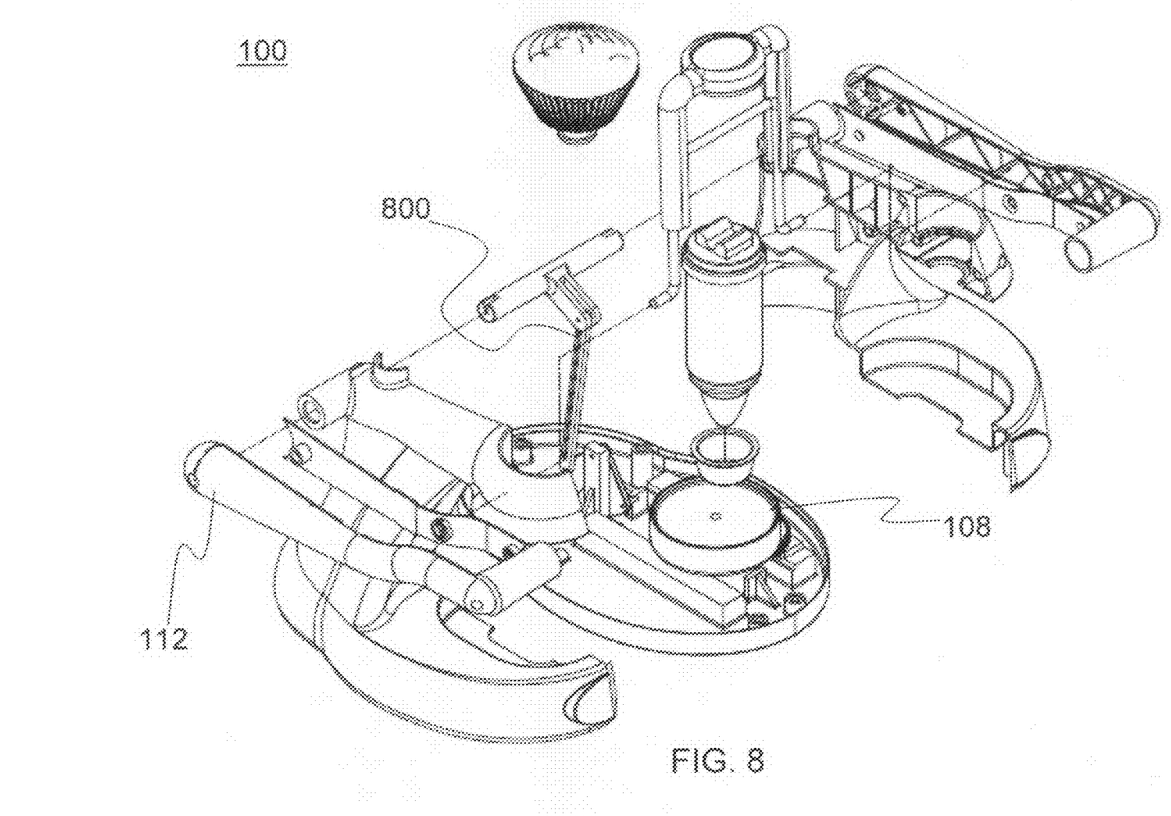
FIG. 8 is a front, exploded-view illustration of a frosting dispenser apparatus according to the present invention.

FIG. 8 illustrates a front, exploded-view of the frosting dispenser apparatus 100, depicting a driving member 800. The driving member 800 is connected with the handle 112 and functions to drive the rotatable platform 108 forward and, ultimately, induce its rotation.

Figure 9:
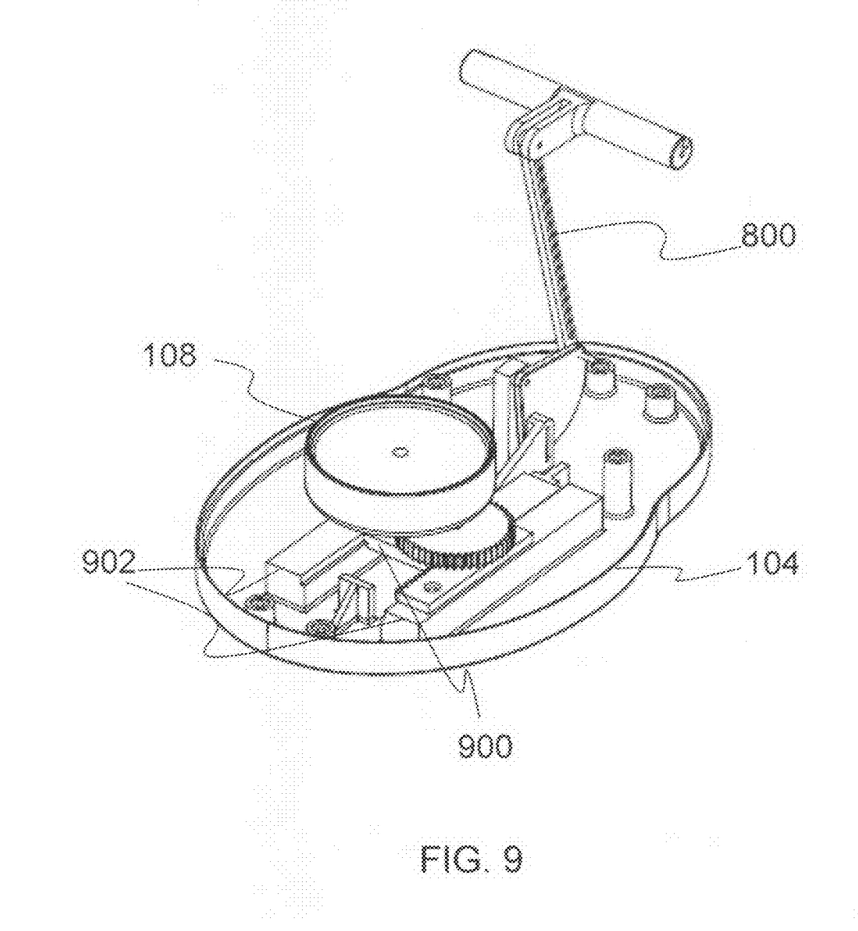
FIG. 9 is a front-view illustration of an interior of a base of a frosting dispenser apparatus according to the present invention.

FIG. 9 illustrates a front-view of the interior of the base 104, depicting a sliding stage 900 in connection with the rotatable platform 108. The sliding stage 900 slides along a set of stage rails 902 when the driving member 800 pushes it forward.

Figure 10:
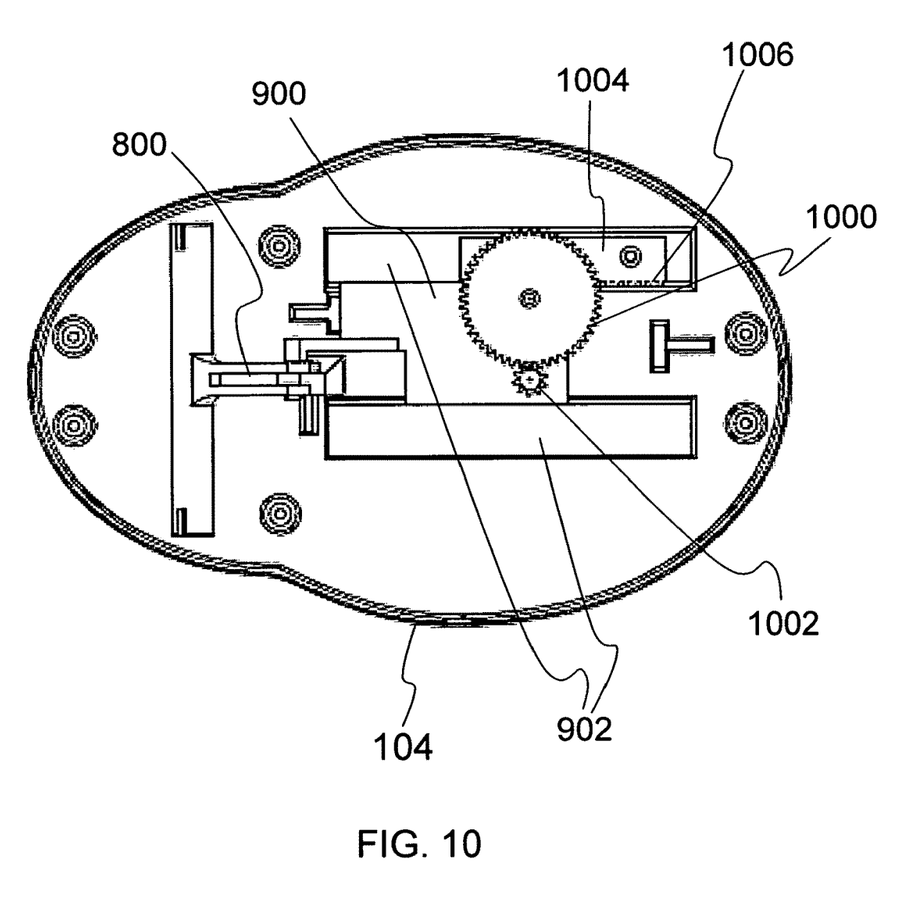
FIG. 10 is a bottom-view illustration of an interior of a base of a frosting dispenser apparatus, with a rotatable base removed for clarity.

FIG. 10 illustrates a bottom-view of the interior of the base 104 depicting a gear mechanism configured to drive rotation of the rotatable platform (not shown). As can be appreciated by one skilled in the art, any type of gear mechanism which performs the same function could be utilized in the present invention. In a desired aspect, the gear mechanism comprises a first gear 1000, a second gear 1002, and a third gear (not shown). The third gear is connected with and located directly below the first gear 1000. The gears are connected by any suitable mechanism, a non-limiting example of which includes a rod inserted through both gears (i.e., first gear 1000 and third gear), such that the gears rotate simultaneously. Each of the gears is connected with the sliding stage 900.

Figure 11:
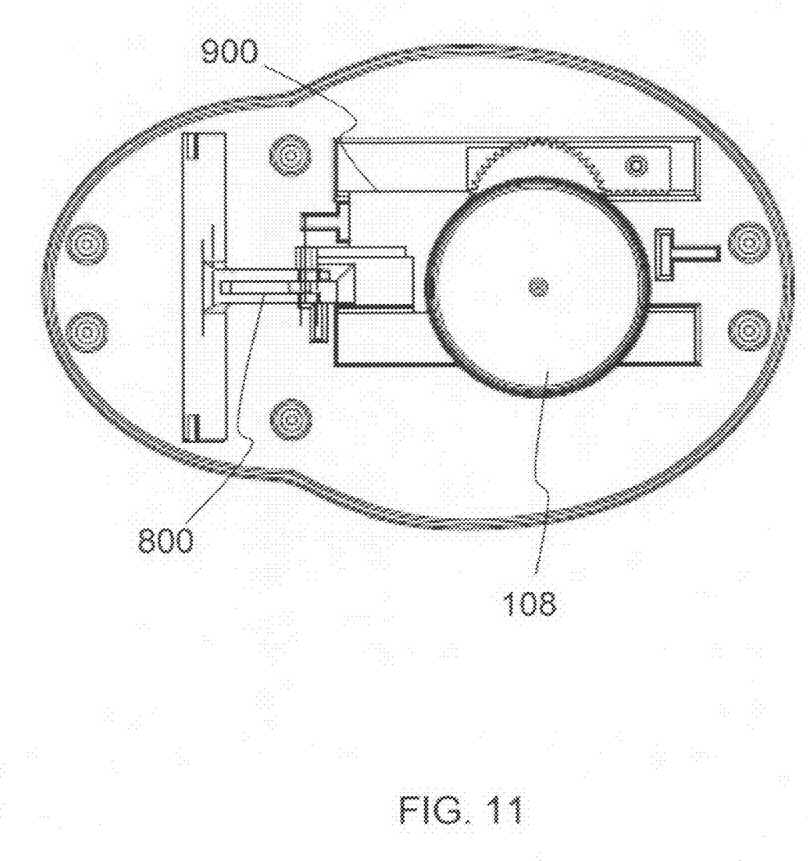
FIG. 11 is a top-view illustration of an interior of a base of a frosting dispenser apparatus.

Furthermore, a gear rail 1004 with an edge having gear teeth 1006 is mounted to at least one of the stage rails 902, such that the third gear (not shown) meshes with the gear teeth 1006 of the gear rail 1004. When the driving member 800 pushes the sliding stage 900 forward, the third gear (not shown) interacts with the gear teeth 1006 of the gear rail 1004 to cause the third gear to rotate. This interaction, in turn, causes the first gear 1000 to rotate. Rotation of the first gear 1000 further causes rotation of the second gear 1002. Contrasting FIG. 11 with FIG. 10, the rotatable platform 108 is connected with and located directly above the second gear (shown in FIG. 10), such that rotation of the second gear causes rotation of the rotatable platform 108. Thus, the driving member 800 pushes the sliding stage 900 forward and the gear mechanism described above induces rotation of the rotatable platform 108.

Figure 12:
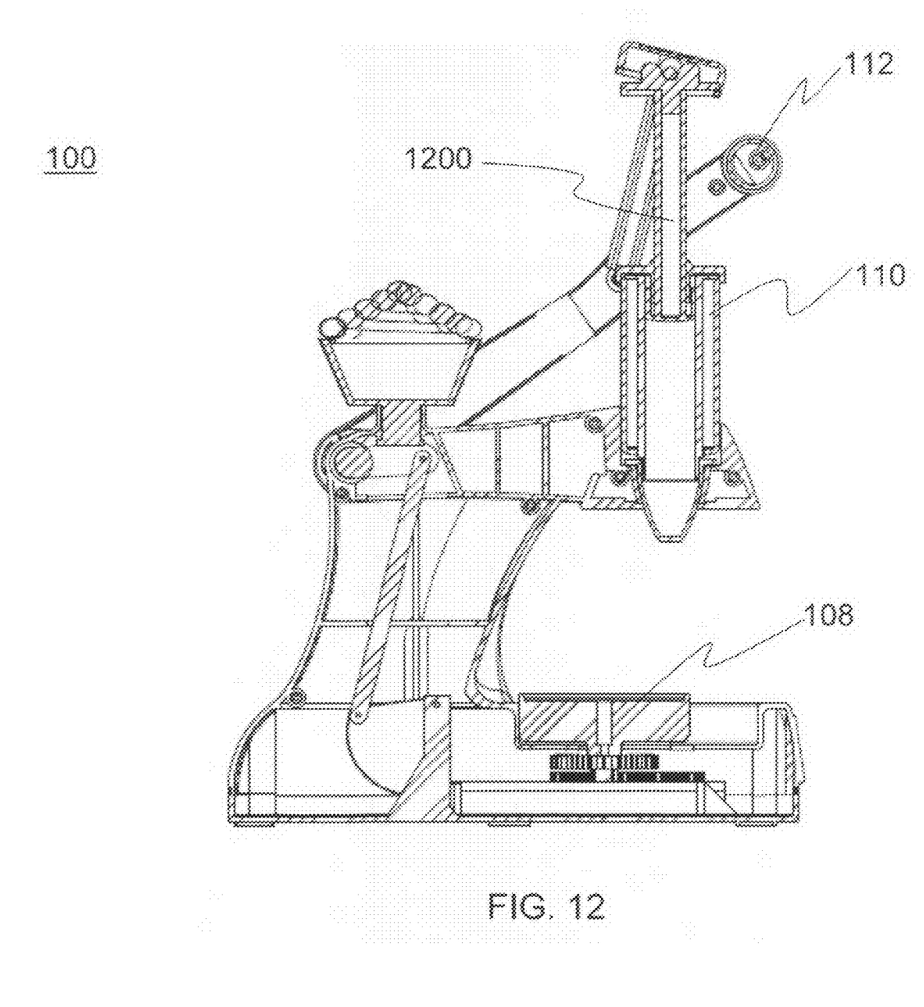
FIG. 12 is a sectional-view illustration of a frosting dispenser apparatus according to the present invention, showing a dispenser actuator in a first position.

FIG. 12 illustrates a sectional-view of the frosting dispenser apparatus 100 showing the handle 112 in a first (e.g., upper) position. In this position, the dispenser 110 is not dispensing its contents. As shown, in a desired aspect of the dispenser 110, a plunger element 1200 is included. When the handle 112 is in the upper position and the dispenser 110 is not dispensing its contents, the rotatable platform 108 is not located directly below the dispenser 110.

Figure 13:
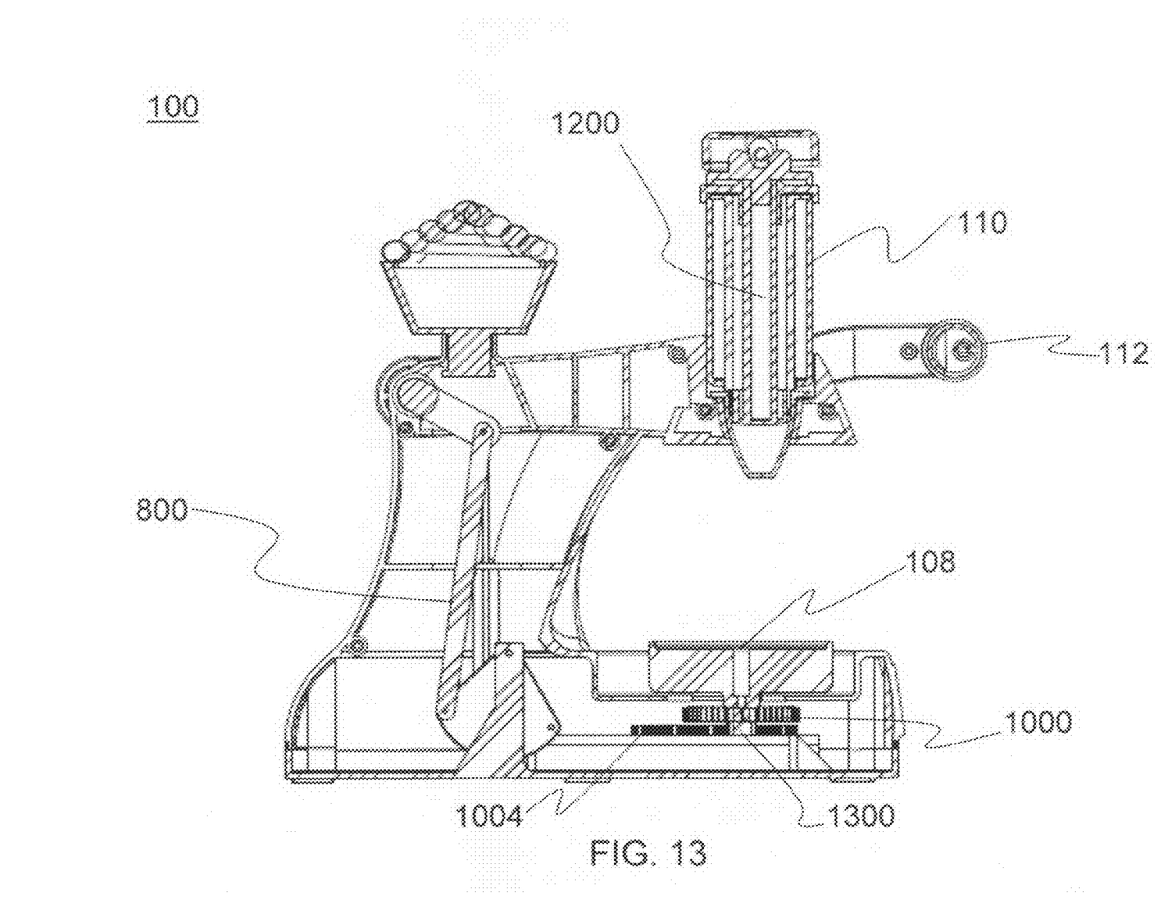
FIG. 13 is a sectional-view illustration of a frosting dispenser apparatus according to the present invention, showing a dispenser actuator in a second position.

FIG. 13 illustrates a sectional-view illustration of the frosting dispenser apparatus 100 showing the handle 112 in a second (e.g., lower) position. The lowering of the handle 112 causes the driving member 800 to move forward such that it pushes the sliding stage (not shown) and, therefore, the rotatable platform 108 forward. Lowering of the handle 112 also directs the plunger element 1200 downward so that the contents of the dispenser 110 can be dispensed. Additionally, the rotatable platform 108 is now positioned directly below the dispenser 110 for accurate dispensing of the contents of the dispenser 110 onto a baked good (not shown) located on the rotatable platform 108. As the sliding stage (not shown) is pushed forward, the third gear 1300 interacts with the gear rail 1004 and rotates to cause rotation of the rotatable platform 108, such that the rotatable platform 108 rotates once it is directly under the dispenser 110. In another aspect, when the handle 112 is in the first position, the rotatable platform 108 is centered directly beneath the dispenser 110. As the handle 112 is depressed and the rotatable platform 108 is forced forward, the rotatable platform 108 moves such that when the handle 112 is in the second position, the perimeter of the rotatable platform 108 is beneath the dispenser 110. Thus, as the user dispenses the contents of the dispenser 110, the rotatable platform 108 is steadily moved forward such that the contents are not dispensed in a single location but across the width of the item.

Figure 14:
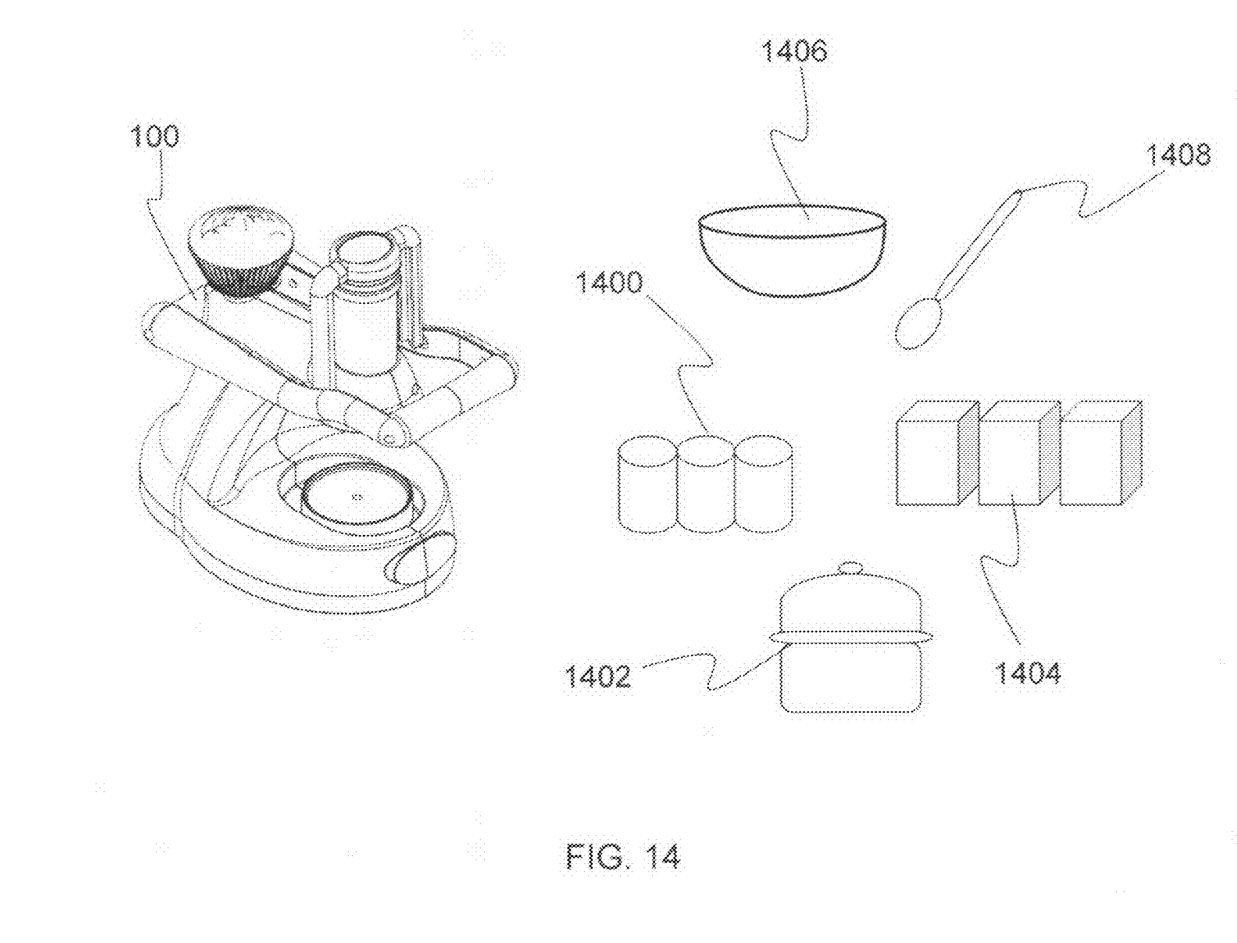
FIG. 14 is a front-view of a frosting dispenser kit according to the present invention.

FIG. 14 illustrates a frosting dispenser kit including a frosting dispenser apparatus 100 as described above. In addition, the frosting dispenser kit comprises at least one container of frosting 1400, at least one baking container 1402, at least one baking mix 1404, at least one mixing container 1406, and at least one baking utensil 1408. In a desired aspect, the baking mix 1404 creates a batter which can be poured into the baking container 1402 and baked into a baked good, a non-limiting example of which includes a cupcake. The cupcake can then be frosted using the frosting dispenser apparatus 100 as described previously in detail. Thus, using the frosting dispenser apparatus 100, frosting can be evenly dispensed across the width of the cupcake as the cupcake rotates and is pushed forward.

What is claimed is:

1. A dispenser apparatus, comprising:
a body having a base and a pedestal;

a sliding stage connected with the base, the sliding stage being connected with the base such that it can slide forward with respect to the base;

a rotatable platform mounted to the sliding stage and configured to rotate a baked good;

a dispenser connected with the pedestal, wherein the dispenser is located above the rotatable platform and formed to dispense contents onto a baked good below, with the sliding stage being operable to move the rotatable platform forward such that the contents are dispensable across a baked good as the rotatable platform rotates the baked good;

a dispenser actuator operatively connected with the dispenser, such that the dispenser actuator causes the dispenser to dispense its contents; and a driving member connected with the dispenser actuator, such that depressing the dispenser actuator pushes the driving member into contact with the sliding stage and drives both the sliding stage and the rotatable platform forward, such that the rotatable platform is below the dispenser.

2. A dispenser apparatus as set forth in claim 1, wherein the dispenser is a plunger dispenser.

3. A dispenser apparatus as set forth in claim 2, further comprising a gear mechanism configured to drive rotation of the rotatable platform.

* * * * *